United States Patent
Doi et al.

(10) Patent No.: US 7,365,636 B2
(45) Date of Patent: Apr. 29, 2008

(54) RFID TAG DEVICE, TAG IDENTIFICATION DEVICE AND RADIO COMMUNICATION SYSTEM

(75) Inventors: Yusuke Doi, Yokohama (JP); Satoshi Ozaki, Kawasaki (JP); Masahiro Ishiyama, Kawasaki (JP); Shirou Wakayama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 11/209,754

(22) Filed: Aug. 24, 2005

(65) Prior Publication Data

US 2006/0044115 A1 Mar. 2, 2006

(30) Foreign Application Priority Data

Aug. 25, 2004 (JP) ............................. 2004-245209

(51) Int. Cl.
*G05B 19/00* (2006.01)
(52) U.S. Cl. ..................... 340/10.4; 380/270
(58) Field of Classification Search ............. 340/10.4, 340/5.26, 5.61, 572.1, 825.69; 380/270, 380/268
See application file for complete search history.

(56) References Cited

U.S. PATENT DOCUMENTS

| | | | | |
|---|---|---|---|---|
| 5,832,090 A | * | 11/1998 | Raspotnik | 705/66 |
| 5,940,002 A | * | 8/1999 | Finn et al. | 340/5.26 |
| 5,970,148 A | * | 10/1999 | Meier | 713/168 |
| 6,167,136 A | * | 12/2000 | Chou | 380/201 |
| 2003/0115477 A1 | * | 6/2003 | Baldwin et al. | 713/193 |
| 2006/0044115 A1 | | 3/2006 | Doi et al. | |

FOREIGN PATENT DOCUMENTS

JP 2001-236325 8/2001
JP 2001-358610 12/2001

OTHER PUBLICATIONS

Ari Juels, et al., "The BlockerTag: Selective Blocking of RFID Tags for Consumer Privacy", CCS, 2003.
U.S. Appl. No. 11/377,256, filed Mar. 17, 2006, Doi, et al.

* cited by examiner

Primary Examiner—Jeffery Hofsass
Assistant Examiner—Nabil Syed
(74) Attorney, Agent, or Firm—Oblon, Spivak, McClelland, Maier & Neustadt, P.C.

(57) ABSTRACT

An RFID tag device has a random number generator which generates a random number or a pseudo-random number, an identification information holding unit which holds identification information having a plurality of bits, a noise addition processing unit which generates noise-added identification information by conducting either of reversal from "0" of a bit decided based on the random number generated by the random number generator to "1" or reversal from "1" of the bit to "0", among a plurality of bits included in the identification information, and a radio communication unit which transmits the noise-added identification information by radio.

18 Claims, 6 Drawing Sheets

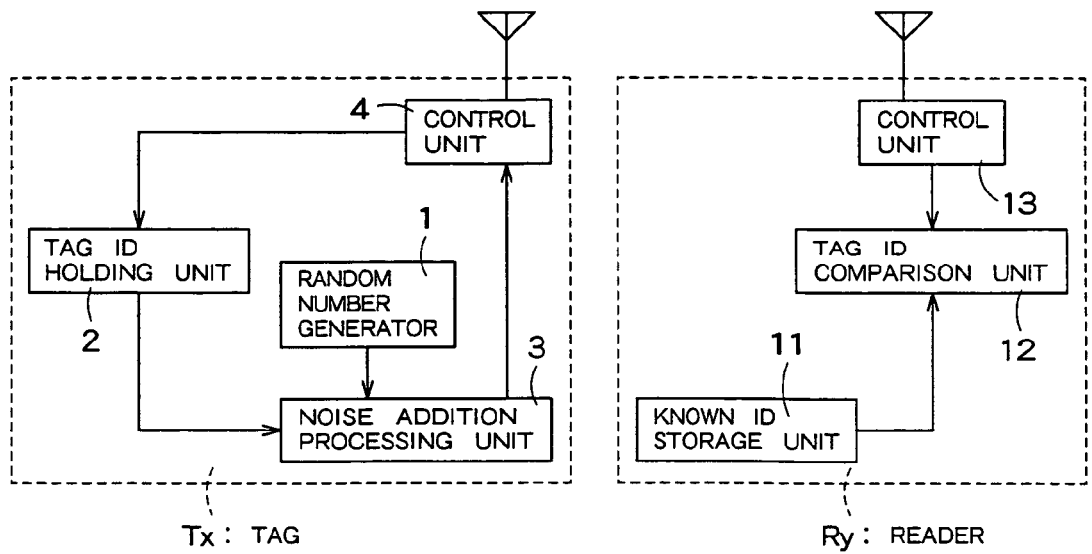
F I G. 1
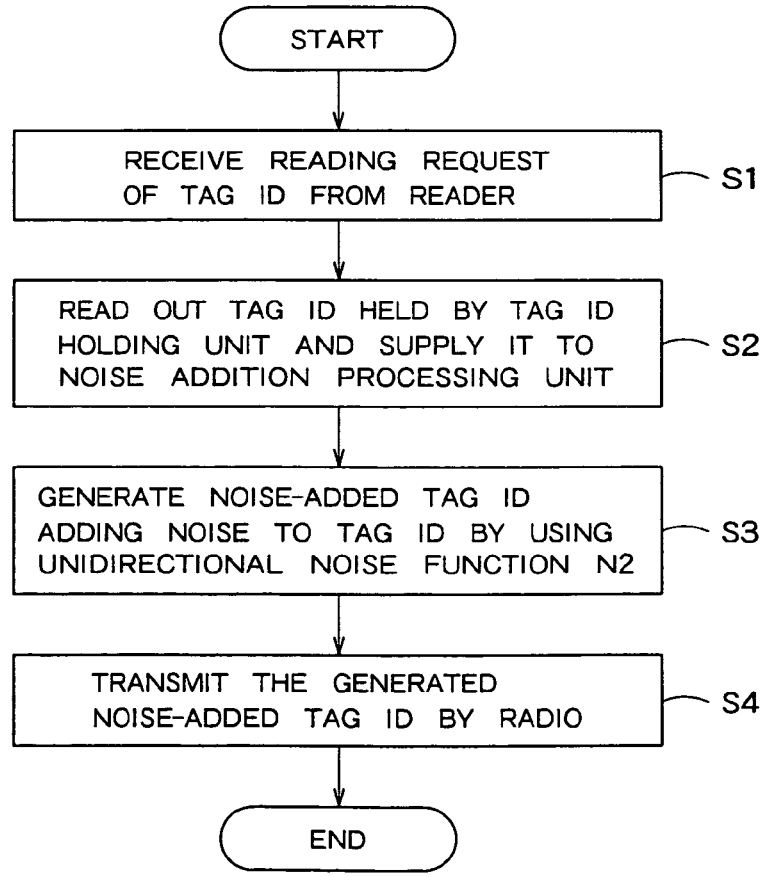
F I G. 2

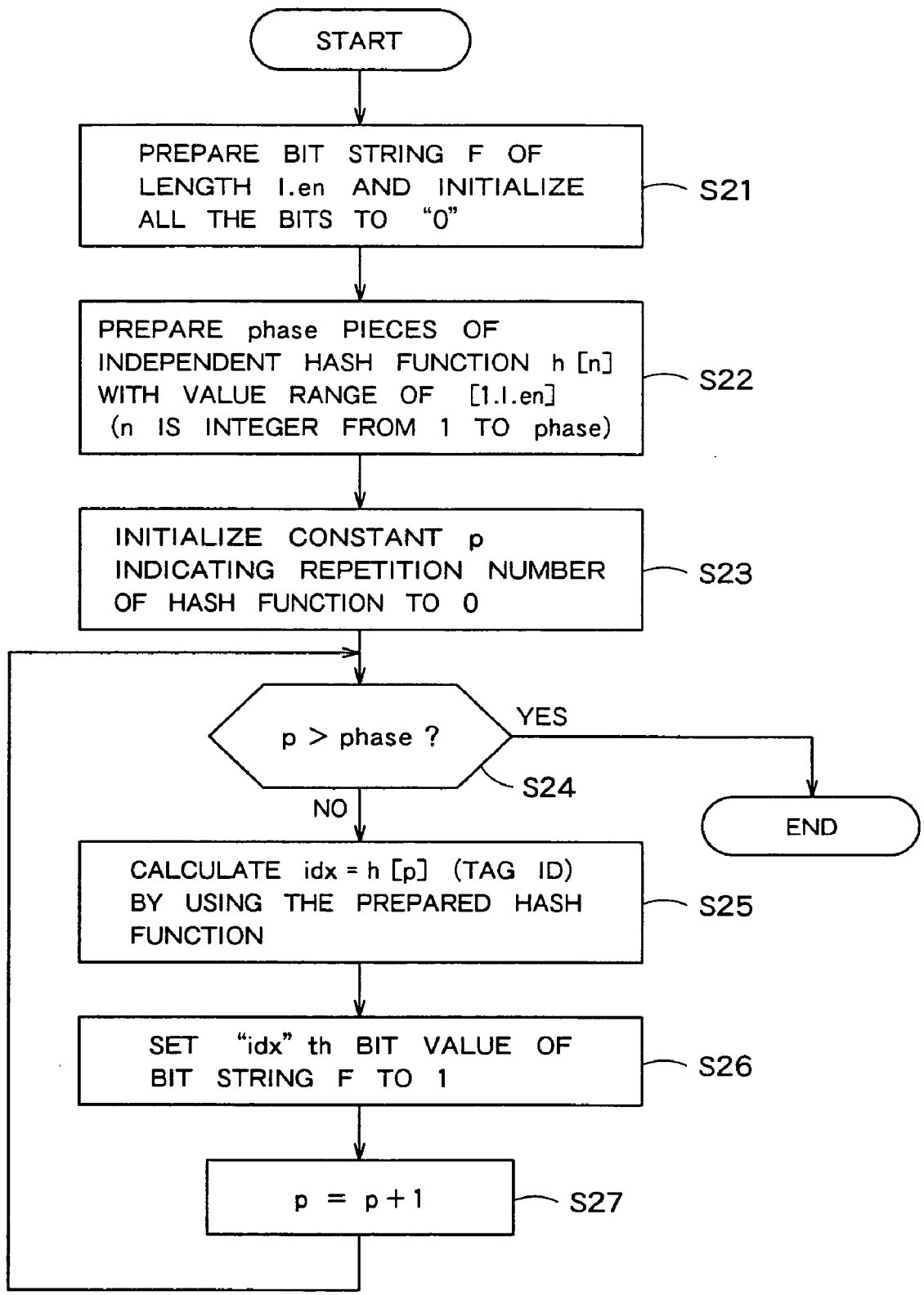
F I G. 5

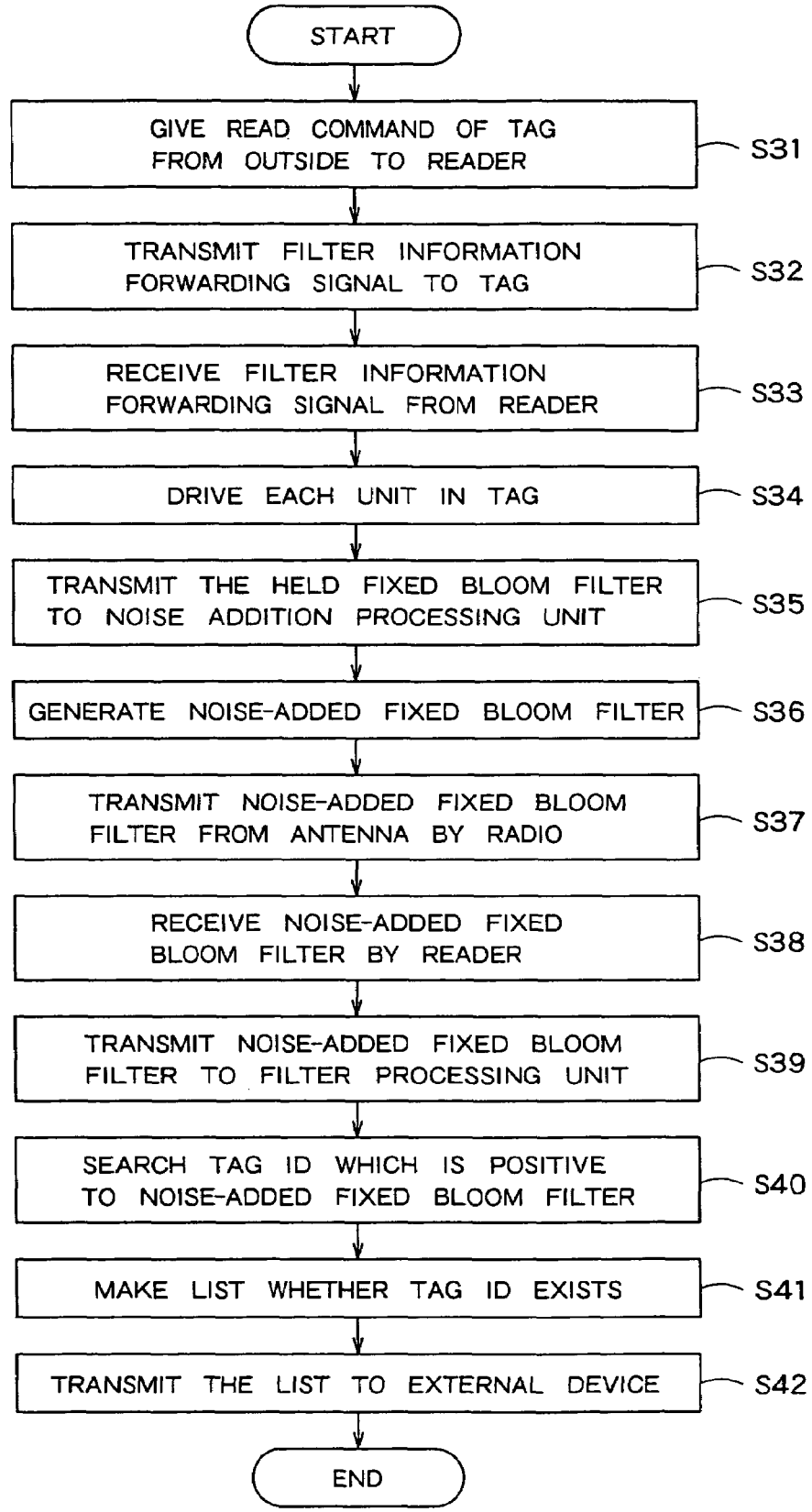
F I G. 6

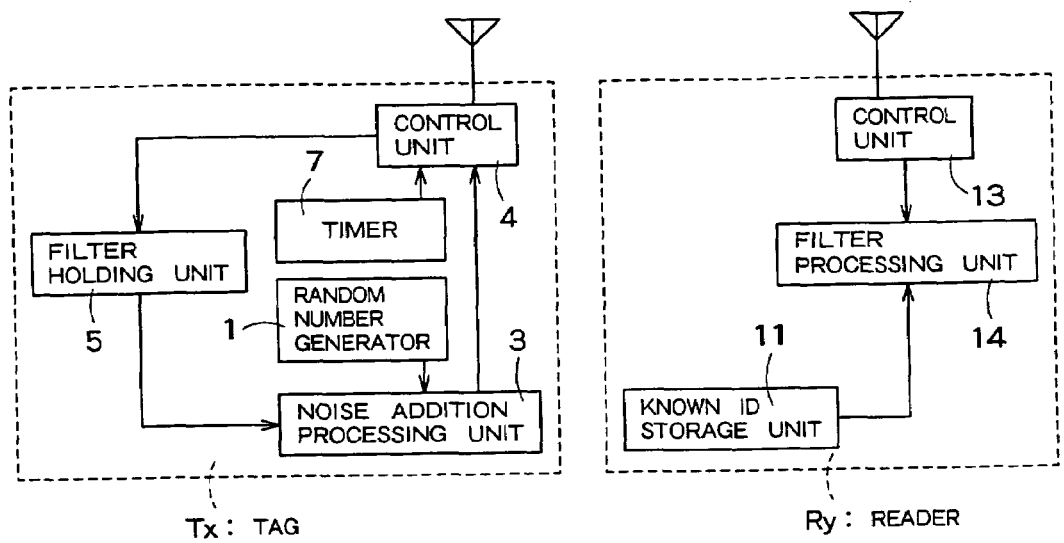
F I G. 9
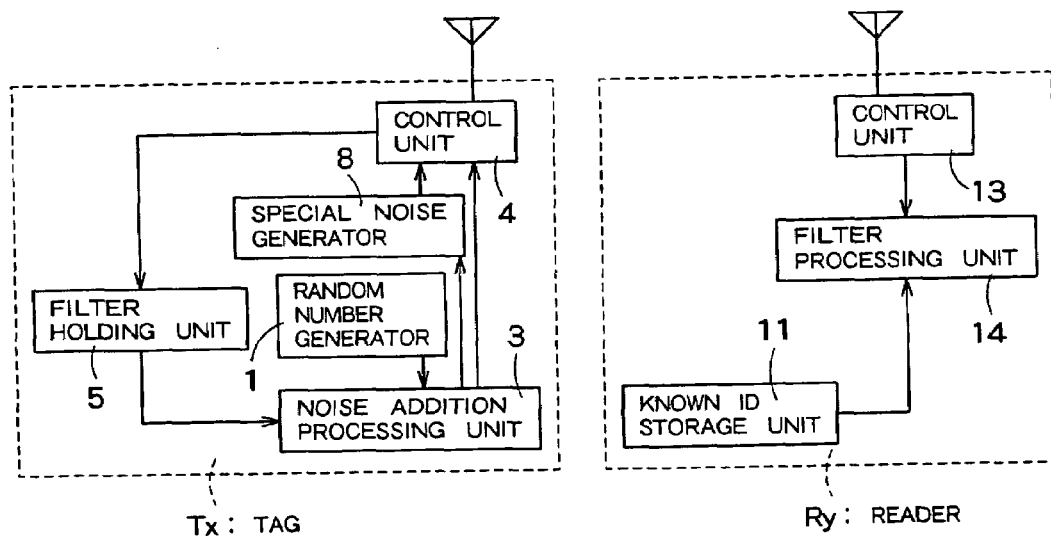
F I G. 10

RFID TAG DEVICE, TAG IDENTIFICATION DEVICE AND RADIO COMMUNICATION SYSTEM

CROSS REFERENCE TO RELATED APPLICATIONS

This application is based upon and claims the benefit of priority from the prior Japanese Patent Application No. 2004-245209, filed on Aug. 25, 2004, the entire contents of which are incorporated herein by reference.

BACKGROUND OF THE INVENTION

1. Field of the Invention

The present invention relates to a RFID tag device for transmitting identification information by radio, a tag identification device for receiving and identifying the identification information, and a radio communication system.

2. Related Art

An RFID (Radio Frequency Identify) tag allows the information to be transmitted or received without contact, and is very convenient for a user. The secure convenience is in a trade-off relation with the risk of privacy leakage of the user for the RFID tag.

For instance, if an RFID tag is attached on a purse, behavior of the purse's owner can be known based on a detection history of the RFID tag for the purse. Also, by associating the owner with the tag detected on the purse, the behavior of the owner can be kept pursued at high probability, even if the owner exchanges the purse.

To defend the user from the privacy leakage using the RFID tag, the following measures (1) to (3), for example, are thought.

(1) Kill Switch/Kill Command
(2) Faraday Cage
(3) Blocker Tag

Kill Switch/Kill Command of (1) is a manner for physically or logically invalidating the tag. The user can be defended from the privacy leakage by invalidating tag by this manner, but may lose the convenience that is sure to be obtained with tag.

The Faraday Cage of (2) is a manner for containing the tag in the material which shields electric wave and invalidating the tag while containing the tag. Though the tag can be validated or invalidated according to the user's intention, the tag is applicable only in limited cases (e.g., the case where the object contained in the chest should not be read from the outside), because the tag itself is often attached on the intended commodity. The convenience obtained by the tag is considerably restricted by the above (2).

Blocker Tag of (3) is a technology proposed by RSA Laboratories (refer to A. Juels, R. L. Rivest, and M. Szydlo. The Blocker Tag: Selective Blocking of RFID Tags for Consumer Privacy, ACM Press. 2003). This technology can be applied in accordance with an ALOHA method (MIT Technical Report MIT-AUTOID-WH-014) that is one of the Anti-Collision methods of the RFID tag. The method has a function of disabling the ID to be read under certain conditions by employing the characteristics of Anti-Collision. On the other hand, when the user wants to read the tag information, it is required that the Blocker Tag is invalidated by keeping the Blocker Tag at a distance or turning off the switch. Though the Blocker Tag is more convenient than the Faraday Cage, it is insufficient as automatic recognition that is one of the purposes of the RFID tag.

As a technology having the similar purpose, the key encryption technology has been proposed (refer to Japanese Patent Application Laid-Open No. 2001-236325).

The technology as disclosed in the patent document 1 is disadvantageous on the aspect of cost, because a sufficient calculation capability is needed for the tag itself.

SUMMARY OF THE INVENTION

This invention may provide a RFID tag device that can transmit the identification information with a simple configuration while maintaining the security, and a tag identification device for receiving and identifying the identification information.

According to one embodiment of the present invention, an RFID tag device, comprising:
  a random number generator which generates a random number or a pseudo-random number;
  an identification information holding unit which holds identification information having a plurality of bits;
  a noise addition processing unit which generates noise-added identification information by conducting either of reversal from "0" of a bit decided based on the random number generated by the random number generator to "1" or reversal from "1" of the bit to "0", among a plurality of bits included in the identification information; and
  a radio communication unit which transmits the noise-added identification information by radio.

Furthermore, according to one embodiment of the present invention, an RFID tag device, comprising:
  a filter holding unit which holds a filter having a plurality of bits capable of probabilistically detecting whether or not a certain bit string is included in a group of bit strings;
  a random number generator which generates a random number or a pseudo-random number;
  a noise addition processing unit which generates a noise-added filter obtained by either of reversal from "0" of a bit decided based on the random number generated by the random number generator or reversal from "1" of a bit decided based on the random number generated by the random number generator among a plurality of bits included in the filter; and
  a radio communication unit which transmits the noise-added filter by radio.

Furthermore, according to one embodiment of the present invention, a tag identification device, comprising:
  a tag information storage unit which stores identification information of a known radio tag device;
  a radio communication unit which receives noise-added identification information or a noise-added filter having a plurality of bits with a noise bit, transmitted from a certain RFID tag device;
  a bit comparison unit which compares a bit having a certain bit value among a plurality of bits included in the received noise-added identification information or the received noise-added filter with corresponding bit of the identification information stored in the tag information storage unit, based on a ratio of bit "0" to bit "1" included in the plurality of bits; and
  a determination unit which determines whether or not the identification information corresponding to the noise-added identification or the noise-added filter received by the radio communication unit is stored in the tag information storage unit based on a result compared by the bit comparison unit.

BRIEF DESCRIPTION OF THE DRAWINGS

FIG. 1 is a block diagram showing the schematic configuration of a radio communication system according to a first embodiment of the invention.

FIG. 2 is a flowchart showing one example of the processing operation of the tag Tx.

FIG. 5 is a flowchart showing one example of the generation procedure of the fixed bloom filter.

FIG. 6 is a flowchart showing the processing operation of a radio communication system according to a second embodiment of the invention.

FIG. 9 is a block diagram showing one example of the schematic configuration of a radio communication system having a timer.

FIG. 10 is a block diagram showing one example of the schematic configuration of a radio communication system with a special noise scheme.

DETAILED DESCRIPTION OF THE INVENTION

Figure 3:
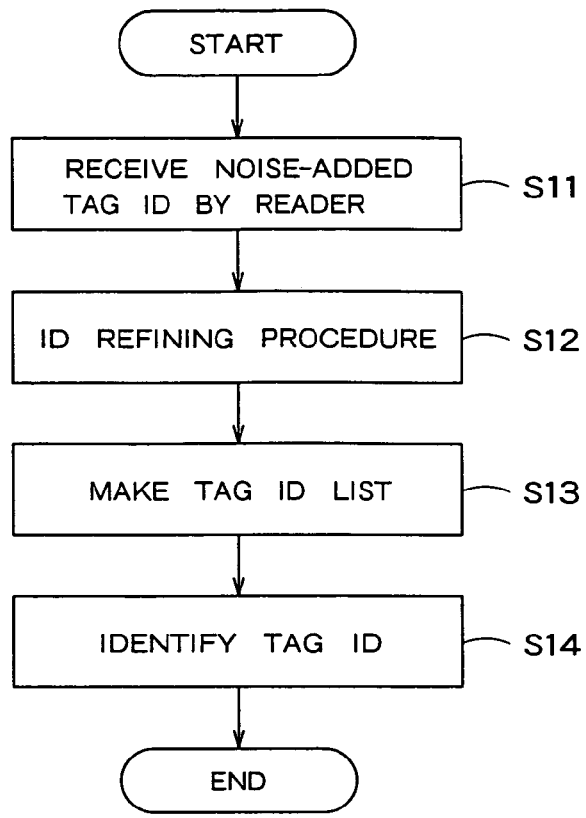
FIG. 3 is a flowchart showing one example of a processing procedure by the reader Ry.

The preferred embodiments of the present invention will be described below with reference to the drawings.

First Embodiment

FIG. 1 is a block diagram showing the schematic configuration of a radio communication system according to a first embodiment of the invention. The radio communication system of FIG. 1 has an RFID tag Tx for transmitting a radio signal in which a tag ID is encrypted, and a reader Ry for identifying the received tag ID.

The RFID tag Tx has a random number generator 1 for generating a random number or a pseudo-random number, a tag ID holding unit 2 for holding a tag ID, a noise addition processing unit 3 for generating a noise-added tag ID in which the noise is added to the tag ID, and a control unit 4 for controlling the transmission and holding of the tag ID. The RFID tag Tx has the portable size, and is attached on various commodities, for example. The RFID tag Tx may contain a memory for storing the information regarding the specific commodity or service.

The reader Ry has a known ID storage unit 11 for storing the known tag ID, a tag ID comparison unit 12 for determining whether the tag ID corresponding to the received noise-added tag ID is stored in the known ID storage unit 11, and a control unit 13 for controlling the storage and comparison of the tag ID.

The noise addition processing unit 3 in the RFID tag Tx generates a noise-added tag ID by reversing the bits decided by the random numbers generated by the random number generator 1 among a bit string consisted of plural bits constituting the tag ID.

One example of the processing operation of the radio communication system in FIG. 1 will be described below in detail. First of all, the functions and constants for use in the following explanation are defined. Saturation s(x) represents a percentage of "1" bit in the bit string x consisted of "0" bit and "1" bit.

Noise function N2(z, sat) is a function of conducting the random bit operation on the bit string z so that saturation s(z) may approach a preset threshold "sat", in which the output of N2(z,sat) is the noise-added tag ID. The bit operation herein is the operation of reversing the bit "0" into bit "1" randomly, if saturation s(z)<sat, or reversing the bit "1" into bit "0" if saturation s(z)≧sat. In the following, it is assumed that "sat" is equal to 0.5.

The tag Tx is the x-th (x=1 to n) tag Tx. "Tx.id" is tag ID of the tag Tx. N2(Tx.id,sat) is the noise-added ID of the tag Tx. The reader Ry is the y-th reader Ry. "Ry.Ti" (i=1 to p) is a list of tag IDs known by the reader Ry.

FIG. 2 is a flowchart showing one example of the processing operation of the tag Tx. First of all, a reading request of tag ID sent by the reader Ry is received (step S1). Then, the control unit 4 in the tag Tx reads the tag ID held in the tag ID holding unit 2, and supplies it to the noise addition processing unit 3 (step S2). Then, the noise addition processing unit 3 generates the noise-added tag ID in which the noise is added to the tag ID by using a unidirectional noise function N2 (step S3). When the tag ID is "Tx.id", the noise-added tag ID is represented as N2(Tx.id,0.5). The noise-added tag ID is generated by using the random number, and has a different value every time the reader Ry reads the tag ID of the tag Tx. Therefore, it is difficult to specify the tag ID of the tag Tx, based on the noise-added tag ID.

The noise addition processing unit 3 adds a noise to the tag ID so that rate of occurrence of "0" and "1" contained in the bit string of the noise-added tag ID may be equal. For example, if s(Tx.id) is less than 0.5, any of "0" bits is reversed to "1", because the occurrence of "0" is more than that of "1". Conversely, if s(x) is greater than or equal to 0.5, any of "1" bits is reversed to "0", because the occurrence of "1" is more than that of "0". This step is repeated until s(x) substantially becomes equal to 0.5. The control unit in the tag Tx transmits the generated noise-added tag ID by radio (step S4).

FIG. 3 is a flowchart showing one example of a processing procedure by the reader Ry. The reader Ry receives the noise-added tag ID (step S11), and then performs an ID refining procedure for verifying which of the tag IDs stored in the ID storage unit corresponds to the received noise-added tag ID (step S12). Herein, the verification is performed with the following procedure.

For each of the tag IDs (Ti: i=1 to n) stored in the ID storage unit, it is determined whether or not saturation s(Ry.Ti) is less than 0.5. If it is less than 0.5, the noise of reversing "0" to "1" is added, or if it is greater than or equal to 0.5, the noise of reversing "1" to "0" is added. Accordingly, for the tag ID in which s(R1.Ti) is less than 0.5, the bit "1" is noticed, because it cannot be identified whether the bit "0" is noise or original signal. And the noticed bit is compared with the bit value of the noise-added tag ID. Conversely, for tag ID in which s(R1,Ti) is greater than or equal to 0.5, the bit "0" is noticed, and the noticed bit is compared with the bit value of the noise-added tag ID.

As a result of the above comparison, a list of tag IDs that may possibly correspond to the acquired noise-added tag ID is made (step S13).

A specific example of the ID refining procedure will be described below. Suppose that the noise-added tag ID is "101011" (binary number), and the tag IDs stored in the storage unit known ID storage unit 11 are "100001", "011011" and "000100". For "100001", the bit "1" is noticed, because saturation s is less than 0.5. Since all the relevant bits of the noise-added tag ID are "1", the possibility in which "100001" corresponds to the noise-added tag ID is high. On the other hand, for "011011", the bit "0" is noticed, because saturation s is greater than or equal to 0.5. Since "1" is contained in the relevant bit of the noise-added tag ID, there is no possibility that "011011" corresponds to the noise-added tag ID. Moreover, for "000100", the bit "1" is noticed. Since the relevant bit of the noise-added tag ID is "0", there is no possibility in which "000100" corresponds to the noise-added tag ID.

In this way, the tag ID is narrowed down. However, with the above ID refining procedure, it is not assured that the narrowed tag ID is correct. Because of this, the reader Ry may specify the tag ID by performing a predetermined confirmation procedure for the tag Tx (step S14). The details of this confirmation procedure will be described later.

As described above, in the first embodiment, the unidirectional noise is added to the tag ID itself on the side of the tag Tx before transmission, and the reader Ry receiving the noise-added tag ID performs the ID refining procedure to retrieve the corresponding tag ID, whereby the tag ID can be transmitted or received in the state where the security is assured without complicating configuration of the tag Tx. That is, since a process for adding the noise is simply performed on the side of the tag Tx, it is possible to simplify the configuration of the tag Tx, whereby the cost and consumption power of the tag Tx are reduced, and the compact and thin-shaped tag Tx is feasible.

Second Embodiment

A second embodiment transmits the tag ID by using the unidirectional noise function and a bloom filter.

Figure 4:
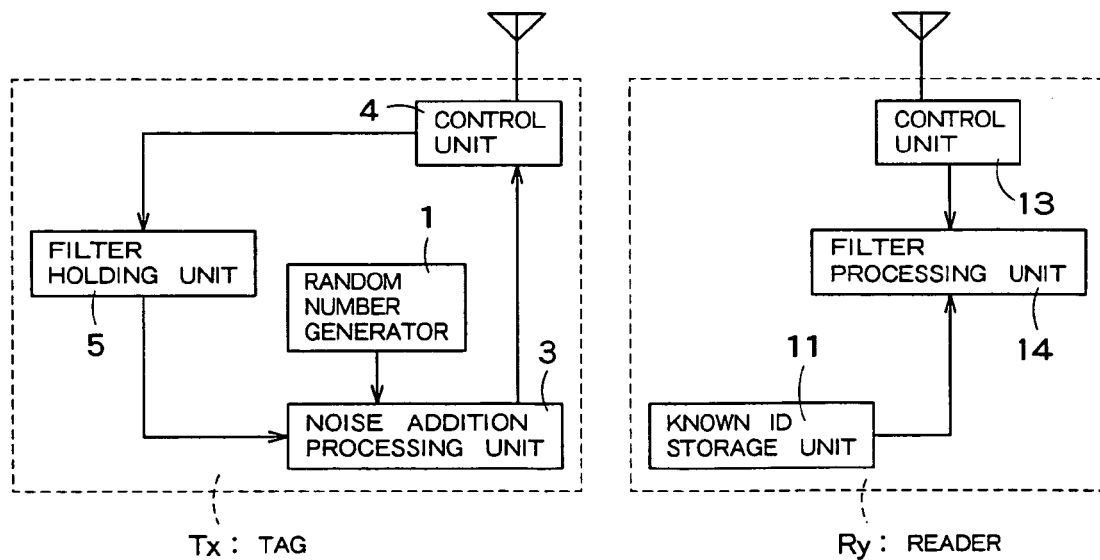
FIG. 4 is a block diagram showing a schematic configuration of a radio communication system according to a second embodiment of the invention.

FIG. 4 is a block diagram showing a schematic configuration of a radio communication system according to a second embodiment of the invention. The radio communication system of FIG. 4 has a tag Tx and a reader Ry in the same way as shown in FIG. 1. The tag Tx has a filter holding unit 5 for holding a fixed bloom filter, a random number generator 1 for generating a random number or a pseudo-random number, a noise addition processing unit 3 for adding a noise to the fixed bloom filter read from the filter holding unit 5, and a control unit 4 for controlling the whole system. The reader Ry has a known ID storage unit 11 for storing a known tag ID, a filter processing unit 14 for identifying the tag Tx corresponding to the received fixed bloom filter, and a control unit 13 for controlling the whole system.

The fixed bloom filter held in the filter holding unit 5 in the tag Tx is represented by BF([i],phase, Len). Where "Len" is the length of filter, "phase" is a number of independent Hash function to make this filter, and "i" is the tag ID.

The bloom filter is used for probabilistically examining whether or not a certain byte string is included in a set of byte strings. By examining the bloom filter, it is determined whether or not an arbitrary byte string D is included in the byte string set S.

In this embodiment, the bloom filter is generated by using the tag ID. The generated bloom filter is called the fixed bloom filter. The generation of the fixed bloom filter is not necessarily conducted in the tag Tx. At a manufacture stage of the tag Tx, the fixed bloom filter produced in an external device may be held in the filter holding unit 5 in the tag Tx. If the fixed bloom filter is generated outside the tag Tx, it is unnecessary to generate the same filter within the tag Tx, whereby the configuration of the tag Tx is simplified.

Since the reader Ry can estimate the tag ID using the fixed bloom filter owned by the tag Tx, it is not required that the tag Tx holds the tag ID.

In the following, a generation procedure of the fixed bloom filter will be described. FIG. 5 is a flowchart showing one example of the generation procedure of the fixed bloom filter. This procedure is not necessarily performed by the tag Tx itself, as described above.

First of all, a bit string F having the length Len is prepared, and all the bits are initialized to "0" (step S21). Then, independent "phase" pieces of Hash functions hn( ) (n=1 to phase) with a value range [1,Len] are prepared (step S22). A different constant (salt) may be given to the same algorithm.

Next, the following process is performed by using the tag ID. First of all, the variable p indicating repetition number of Hash functions is initialized to 0 (step S23). Then, it is determined whether or not the variable p is greater than "phase" (step S24). If so, the procedure is stopped.

If the variable p is smaller than or equal to "phase", idx=hn (tag ID) is calculated, by using the Hash functions prepared at step S22 (step S25). Then, the idx-th bit in the bit string "F" is set to 1 (step S26). Then, the variable "p" is incremented by "1" and the procedure returns to step S24 (step S27).

The noise addition processing unit 3 within the tag Tx reads the fixed bloom filter which is generated in accordance with the procedure of FIG. 5 and held in the filter holding unit 5, and adds the noise by executing the unidirectional noise function No in the same way as in the first embodiment. Herein, the bit is reversed to randomly "1" until the rate (saturation) of bit "1" to all the bits of the fixed bloom filter exceeds a preset reference value "sat" (e.g., 0.5). In accordance with this procedure, a noise-added fixed bloom filter "Tx.BFn" is generated. The generated noise-added fixed bloom filter Tx.BFn is transmitted by radio via the control unit 4.

The filter processing unit 14 within the reader Ry conducts verification, by using the function TBF( ), to determine whether or not the received noise-added fixed bloom filter corresponds to the tag ID stored in the known ID storage unit 11. The function TBF(F,d) verifies whether or not there is possibility that any data "d" is contained in the fixed bloom filter F.

FIG. 6 is a flowchart showing the processing operation of a radio communication system according to a second embodiment of the invention. First of all, a read command of the tag Tx is given to the reader Ry from outside the system (step S31). The control unit 13 in the reader Ry transmits to the tag Tx a signal of requesting the tag Tx to transmit the information of the fixed blood filter held by the tag Tx (a filter information forwarding signal) (step S32).

After the tag Tx receives the filter information forwarding signal from the reader Ry (step S33), the control unit 4 in the tag Tx drives each unit to transmit the noise-added fixed bloom filter (step S34). The filter holding unit 5 transmits the held fixed bloom filter to the noise addition processing unit 3 (step S35). The noise addition processing unit 3 adds the unidirectional noise from "0" to "1" to the fixed bloom filter held by the filter holding unit 5 to generate the noise-added fixed bloom filter (step S36). The control unit 4 in the tag Tx transmits by radio the generated noise-added fixed bloom filter from the antenna (step S37).

The control unit 13 in the reader Ry receives the noise-added fixed bloom filter (step S38), and sends it to the filter processing unit 14 (step S39). The filter processing unit 14 searches whether or not any of the known tag IDs is positive to the received noise-added fixed bloom filter (TBF( ) process) (step S40). Therefore, a list indicating whether or not the tag ID corresponding to the received noise-added fixed bloom filter exists among the tag IDs stored in the known ID storage unit 11 is made (step S41). The control unit 13 transmits the list to the external device which has requested the tag Tx at step S31 (step S42).

As described above, in the second embodiment, the noise-added fixed bloom filter in which the unidirectional noise is added to the fixed bloom filter is transmitted from the tag Tx to the reader Ry, within which the noise-added filter is verified, whereby the security and certainty are more enhanced than in the first embodiment. Also, since the fixed bloom filter generated externally may be held in the tag Tx when the tag Tx is manufactured, it is unnecessary that the fixed bloom filter is generated by the tag Tx itself, whereby the internal constitution of the tag Tx is simplified.

Other Embodiment 1

ID Confirmation Procedure

In the ID refining procedure and the filter refining procedure that are performed in the first and second embodiments, an only ID list in the tag Tx, which cannot deny a possibility that the ID exists is obtained. It cannot be confirmed whether or not a certain tag Tx actually exists there. Therefore, to specify the tag Tx, it is required that the actual tag ID is given to the tag Tx and confirmed. In making this confirmation procedure, when the tag ID is transferred in plain text on carrier wave, it is necessary to pay attention to various attacks such as eavesdropping.

More specifically, a function of replying "true" if an inquiry for the ID adaptable to the tag ID on the side of the tag Tx is received, and replying "false" if an inquiry for the ID different from the tag ID is received may be implemented on the side of the tag Tx, and the reader Ry may conduct an inquiry for each tag ID in the tag ID list using this function. This procedure is generically referred to as the ID confirmation procedure.

In the ID confirmation procedure, the tag ID is not transmitted in plain text, but may be confirmed by a method of using both the random number and the unidirectional Hash function. However, the tag Tx must have a computation capability of the Hash function. In this case, the reader Ry transmits the random number to the tag Tx, and thereafter the tag Tx generates the random number r2, whereby the Hash value H is computed for the composite number of received r1, generated r2 and tag ID. Moreover, r2 and H are replied. The reader identifies the ID by verifying which ID and r1 to synthesize with r2 as a clue.

The Hash value is similarly computed for each ID that becomes positive as a result of test, whereby it is possible to verify whether or not the matched ID exists. However, this method is not perfect because there is possibility of collision for the Hash function. This possibility is ignored if an algorithm (SHA-256, etc.) with difficulty of collision is used.

On the other hand, the ID confirmation procedure that conducts the confirmation to exclude only the ambiguous portion may be conceived. In this case, there are possibly two methods of excluding the ambiguous portion of the tag ID and excluding the colliding portion of the fixed bloom filter. In a method for excluding the ambiguous portion of the tag ID, the bit with a difference is marked among the ID candidates remaining as a result of the ID refining procedure or the ID refining procedure through the filter, and the final candidate of the tag Tx is clarified by using this difference.

More specifically, in a case where there are four candidates, and the identified tag Tx is uniquely decided as one of the candidates by marking the fourth bit and the sixth bit of the bit string indicating the tag ID, the fourth bit and the sixth bit is inquired to the tag Tx.

In this inquiry, a portion of the ID of the tag Tx is directly read. Because of this, it is desired that the tag Tx is provided with a function of excluding the consecutive inquiries, by using a timer and so on.

In the method for transmitting the difference bit alone, the tag Tx of object can be identified at high probability, while there is the advantage that the eavesdropper cannot identify the tag Tx. Another method for making an inquiry for the ambiguous bit to the tag Tx may be conceived, taking notice of not the tag Tx but the bit string of the noise-added fixed bloom filter.

As a different method, the occurrence probability of false positive fixed bloom filter may be decreased to a practical safe level (e.g., 1.0E-10) by increasing the Hash number "phase" or providing a plurality of constants "salt" given in generating the Hash function to generate a plurality of fixed bloom filters. In this case, the confirmation procedure for ID may be possibly unnecessary. Though this method is superior to the method of using the Hash function in respect of reducing computation cost on the side of the tag Tx, there is a drawback that there is no way of avoidance when a combination of the tag ID being necessarily false-positive and the ID set known to the reader Ry occurs. To compensate this drawback, it is required to decrease the false-positive occurrence probability by providing a number of fixed bloom filters. In this case, since the amount of memory capacity has to be increased, the cost may increase.

Though the fully low false-positive occurrence probability leads to the possibility of brute force attack at off-line at the same time, this method can considerably decrease this possibility of successful attack.

Other Embodiment 2

Anti-Collision Method

In the first and second embodiments as above described, an anti-collision function may be provided. To make the anti-collision, a known method such as ALOHA may be applied by temporarily using the random number generated by the random number generator 1 in the tag Tx as the ID of the tag Tx itself.

Figure 7:
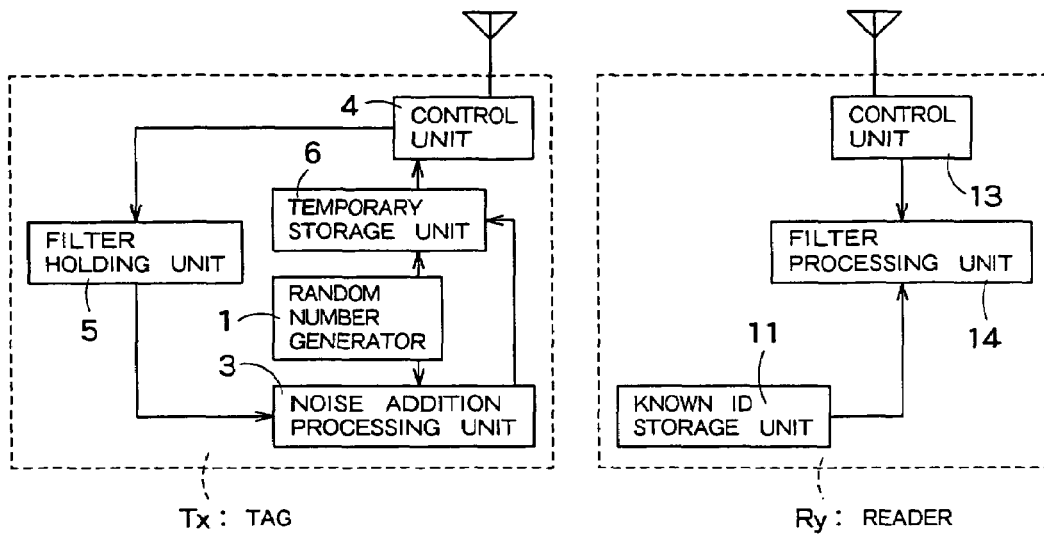
FIG. 7 is a block diagram showing one example of the schematic configuration of a radio communication system with the anti-collision function.

FIG. 7 is a block diagram showing one example of the schematic configuration of a radio communication system with the anti-collision function. In FIG. 7, the common parts to FIG. 4 are designated by the same numerals, and in the following, the different points are mainly described. The tag Tx in the radio communication system of FIG. 7 has a temporary storage unit 6 in addition to the configuration of FIG. 4. This temporary storage unit 6 stores the random number generated by the random number generator 1 in the tag Tx.

Figure 8:
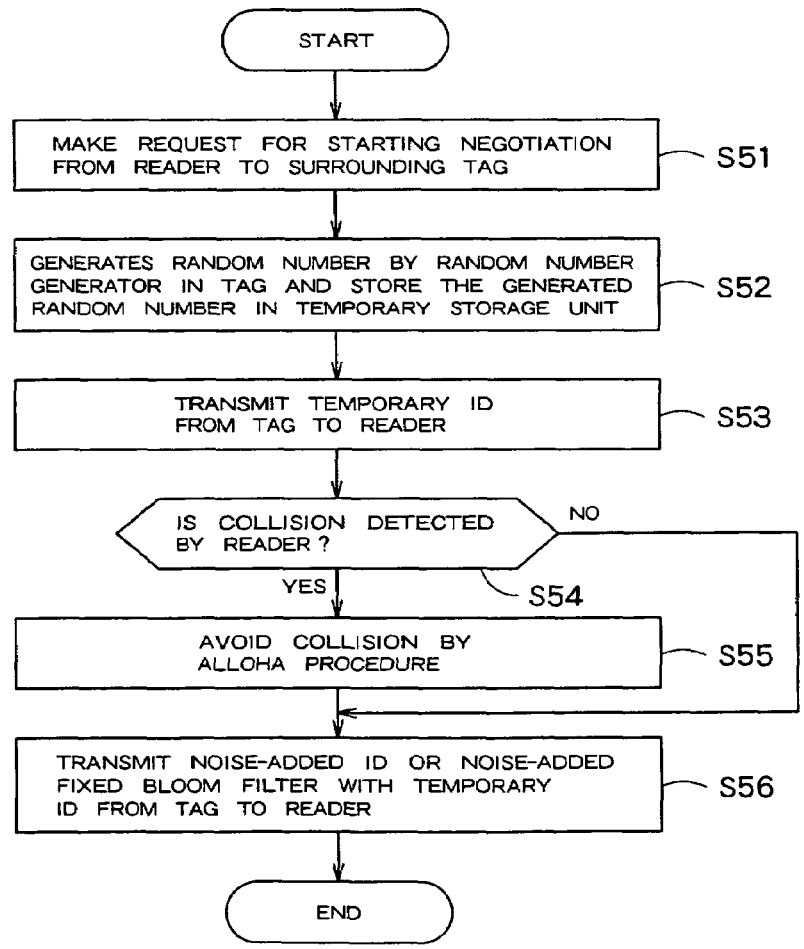
FIG. 8 is a flowchart showing one example of a processing procedure of the radio communication system as shown in FIG. 7.

FIG. 8 is a flowchart showing one example of a processing procedure of the radio communication system as shown in FIG. 7. First of all, the reader Ry makes a request for starting the negotiation to the surrounding tag Tx (step S51). The tag Tx receiving this request generates the random number in the random number generator 1 and stores the generated random number in the temporary storage unit 6

(step S52). The random number stored in the temporary storage unit 6 is used as the temporary ID.

Then, the tag Tx transmits the temporary ID to the reader Ry (step S53). Then, it is determined whether or not collision is detected in the reader Ry (step S54). If collision is detected, collision is avoided in accordance with the ALOHA procedure (step S55).

After the temporary ID is identified by making the anti-collision with the ALOHA, the tag Tx attaches the temporary ID to the noise-added tag ID (or the fixed bloom filter with noise) for the reader Ry, when the reader Ry performs the ID refining procedure, whereby there is no risk that the tag Tx is mistaken for another tag Tx, and the collision of communication is avoided (step S56).

Other Embodiment 3

Use of Plural Filters

When a sufficient capacity of memory exists in the tag Tx in the second embodiment, a plurality of fixed bloom filters may be generated and held in the filter holding unit 5 in the tag Tx. In this case, a method for conducting the communication by generating the filters is conceivable as follows.

First of all, when the Hash number "phase" is larger in comparison with the length of filter, the fixed bloom filter is identified at higher risk. A ratio of the "phase" to the length of the filter express degree of identification. Normally, the "phase" is considerably smaller than the length of the filter. When a bit string is configured by using a Hash function with 40 phases for a filter with 100 bits, the noise is limited to as much as 10 bits. Therefore, the fixed bloom filter is relatively identified easily. On the other hand, the greater length of filter leads to higher communication cost. As the filter is longer, a memory load increases, and it takes more time for transmission and reception. Accordingly, the tag Tx usually transmits a filter having a shorter filter length while the relationship between the filter length Len and the Hash number phase is kept constant. The reader Ry requests a longer filter, when it fails identification due to false-positivity or the expected probability of false-positivity is required to be low (in the case of including many known IDs).

A filter having a small phase (about 5, the false-positive occurrence probability is about 0.03125) and a filter having a large phase (multiple stages: about 33, the false-positive occurrence probability is 1.164153218269348e-10) are prepared.

The length of filter for the Hash number "phase" is a parameter for deciding the privacy strength of the tag ID. Usually, it may be required to be about 20 to 100 times the Hash number "phase". Accordingly, when the Hash number "phase" is 5, 100 to 500 bits are required, and when the Hash number "phase" is 33, about 660 to 3300 bits are required.

Other Embodiment 4

Fixed Bloom Filter Estimation Attack Due to Repetitive Reading and its Measures

The eavesdropper may identify the tag Tx by knowing the fixed bloom filter of the tag Tx. When the third party who does not know the ID of the tag Tx pursues a certain tag Tx, the noise-added fixed bloom filter may be used. The noise-added fixed bloom filter is obtained by performing the operation of reversing the random bits of the fixed bloom filter from "0" to "1", but no operation of reversing them from "1" to "0". Therefore, a number of noise-added fixed bloom filters for the certain tag Tx are collected, and "bitwise and" is operated (AND for every bit) to specify the fixed bloom filter.

For this estimation attack of the fixed bloom filter, there are following three methods to make it difficult for the eavesdropper to identify the fixed bloom filter.

(1) Timer method
(2) Temporary storage method
(3) Use of special noise generator The timer method (1) restricts the number of fixed bloom filters with noise that can be acquired by the eavesdropper, by using a timer. If it takes a long time to repetitively acquire the fixed bloom filter with noise for the certain tag T1, there is possibility that the different tag T2 (or T{3 . . . n}) is mixed into a detection range of the reader R, whereby the eavesdropper is difficult to specify the fixed bloom filter. Therefore, the minimum transmission interval that the tag Tx transmits the noise-added fixed bloom filter to the reader Ry is controlled by the timer so that the tag Tx may not transmit a number of noise-added fixed bloom filters simultaneously in a short time.

FIG. 9 is a block diagram showing one example of the schematic configuration of a radio communication system having a timer. As shown in FIG. 9, the tag Tx is provided within a timer 7. This timer 7 measures the time since the noise-added fixed bloom filter is transmitted. While the time measured by the timer 7 does not reach a predetermined time, no new noise-added fixed bloom filter is transmitted under the control of the control unit. The timer 1 in FIG. 9 may be provided in the tag Tx in the radio communication system in FIG. 1.

The temporary storage method (2) uses the temporary storage unit 6 of FIG. 7 as described in connection with the anti-collision method. By holding the noise-added fixed bloom filter in the temporary storage unit 6, only one kind of noise-added fixed bloom filter is read at the same time, whereby the estimation of the fixed bloom filter by the eavesdropper is prevented. The temporary storage unit 6 is constituted of an SRAM temporarily held by a capacitor, and it is assumed that contents in the SRAM disappear after the passage of a certain time.

The special noise generator (3) uses a noise generator for the noise, which is disadvantageous for the eavesdropper, in the noise addition processing unit 3. For instance, by using a noise generation function that continues to generate the analogous noise close to the noise for a certain time after generating the initial noise, the eavesdropper acquires the fixed bloom filter with noise for similar pattern. It takes time to identify the specific fixed bloom filter. With a property that if a number of noise-added fixed bloom filter are read in a short time, saturation approaches 1, the same effect as the case of using the timer can be obtained.

FIG. 10 is a block diagram showing one example of the schematic configuration of a radio communication system with a special noise scheme. A special noise generator 8 as shown in FIG. 10 generates the noise similar to that of the fixed bloom filter with noise immediately before. The control unit 4 synthesizes the noise generated by the special noise generator 8 into the noise-added fixed bloom filter to conduct the radio transmission. The special noise generator 8 in FIG. 9 may be provided in the tag Tx in the radio communication system in FIG. 1.

Other Embodiment 5

Coping Method for Brute Force Attack at Offline

In the brute force attack at offline against the noise-added fixed bloom filter, easiness is decided by the false-positive occurrence probability for the obtained fixed bloom filter with noise and the size of the ID space. Herein, it is assumed that the Hash number phase is 30 and the saturation is 0.5.

When the ID space has 32 bits, if a test for the filter is conducted in the entire ID space, about four IDs on average are obtained on computation. In this case, once the attacker gets the ID candidates from the filter, a test with about four candidates needs only to be conducted for another filter so that the tag Tx of concern can be tracked.

When the ID space is extended up to 128 bits, the attack is remarkably difficult, and the number of IDs obtained is as large as about 3.17E29, so that the following refinement is also difficult.

As a property of the fixed bloom filter, it is unnecessary that the configuration of the original ID space is defined in advance. That is, any character string including a domain name may be used for the ID. With this property, the formation of the brute force attack by the attacker is made difficult in this embodiment.

Other Embodiment 6

Coping Method for the Fixed Bloom Filter Estimation Attack

Hereinafter, we will explain the above other embodiment 4 in detail. The eavesdropper can identify the tag Tx by knowing the fixed bloom filter of the tag Tx. Therefore, a method for finding the fixed bloom filter from the noise-added fixed bloom filter is examined.

The noise-added fixed bloom filter is obtained by reversing the random bits of the fixed bloom filter from "0" to "1", but the operation of reversing the bits from "1" to "0" is not essentially performed. Hence, a number of fixed bloom filters are acquired, and bitwise AND is conducted to specify the fixed bloom filter, as described above.

The number of bits of the fixed bloom filter BFs in the filter length Len is almost decided by the Hash number "phase". Of the same number of bits, a number of bits equal to the Hash number "phase", or slightly less than the Hash number phase at the collision time of Hash value are practically "1".

Accordingly, phase/Len is approximate to the expected value (characteristic bit ratio) of the existence ratio of bits characterizing the tag Tx in the filter. More strictly, since the collision probability of Hash value is 1/Len, it is slightly smaller.

Herein, the third party (eavesdropper) in pursuit is required to detect the tag Tx to be tracked at high probability from numerous tag Txs. Thus, the noise-added fixed bloom filter BFn transmitted from the tag Tx is received and bitwise AND operation is conducted. It is assumed that a series of fixed bloom filters with noise BFn transmitted from the tag Tx are BFn1, BFn2, . . . , BFni. At this time, the detected fixed bloom filter BFd is obtained through the bitwise AND operation.

Herein, on the premise that the saturation of the noise-added fixed bloom filter BFn is constant (sat), the saturation of the detected fixed bloom filter BFd is represented by the expression (1).

(Number of bits being always 1+number of bits surviving from bitwise and)/Len=[Phase+((Len-phase)·sat2^i)]/Len     (1)

Herein, it is required that "sat2" is irrelevant of influence of the number of bits 1 from the beginning on the fixed bloom filter BFs. For the computation, it is assumed that "sat2" is approximately equal to sat.

For example, assuming the Hash number phase=10, the filter length Len=500 and sat=0.5, the number (i) that the eavesdropper arranges the noise-added fixed bloom filter BFn and a ratio of characteristic bit ratio to saturation of the detected fixed bloom filter BFd are obtained.

$i = 1 \rightarrow$ characteristic bit ratio/saturation of $BFd$ $= 0.0392156862745098$ $i = 2 \rightarrow$ characteristic bit ratio/saturation of $BFd$ $= 0.07547169811320754$ $i = 3 \rightarrow$ characteristic bit ratio/saturation of $BFd$ $= 0.1403508771929825$ $i = 4 \rightarrow$ characteristic bit ratio/saturation of $BFd$ $= 0.2461538461538461$ $i = 5 \rightarrow$ characteristic bit ratio/saturation of $BFd$ $= 0.3950617283950617$ $i = 6 \rightarrow$ characteristic bit ratio/saturation of $BFd$ $= 0.5663716814159293$ In this way, at a stage of i=6, the detected fixed bloom filter BFd includes half or more of the characteristic bit ratio.

By providing plural fixed bloom filters, the eavesdropper can easily identify the tag Tx. To prevent the estimation attack of the fixed bloom filter, a measure must be taken not to give mutually independent noise-added fixed bloom filters BFn to the eavesdropper. At the same time, if it is not convinced that plural noise-added fixed bloom filters BFn are originated from the same tag Tx, the eavesdropper can not perform bitwise and.

This is because the noise-added fixed bloom filters BFns generated from different tags Tx are mixed, whereby there is possibility that the bits of the fixed bloom filter BFs identified may be dropped. If saturation is 0.5, half of the bit information contained in the fixed bloom filter BFs may be lost every time one noise-added fixed bloom filter BFn for different tag Tx is mixed into a series of BFn.

As a specific anti-attack method, the tag Tx may be provided with the following function. One or more functions may be provided in consideration of the cost taken for the tag Tx.

(1) Timer: if it takes long time to repetitively acquire the noise-added fixed bloom filter, the possibility that the different tag Tx is mixed into the detection rage (risk for the eavesdropper) is increased. Therefore, the minimum forwarding time interval for transmitting the noise-added fixed bloom filter BFn is controlled by the timer, so that a number of noise-added fixed bloom filters BFn may not be transmitted in a short time.

(2) Linkage with temporary ID: the temporary ID for anti-collision and the noise-added fixed bloom filter BFn are linked. Thereby, the noise-added same fixed bloom filter BFn is only transmitted while the same temporary ID is used, whereby the eavesdropper is difficult to associate plural noise-added fixed bloom filter BFn with the same temporary ID.

(3) Use of special noise generation function: By using a noise generation function of continuing to generate the analogous noise close to the noise for a certain period of time after the initial noise is generated, the lower saturation of the fixed bloom filter BFd can be suppressed.

What is claimed is:

1. An RFID tag device, comprising:
   a random number generator which generates a random number or a pseudo-random number;
   an identification information holding unit which holds identification information having a plurality of bits;
   a noise addition processing unit which generates noise-added identification information by conducting either of reversal from "0" of a bit decided based on the random number generated by the random number generator to "1" or reversal from "1" of the bit to "0", among a plurality of bits included in the identification information; and
   a radio communication unit which transmits the noise-added identification information by radio.

2. An RFID tag device according to claim 1, further comprising a temporary storage unit which stores the random number generated by the random number generator,
   wherein the radio communication unit transmits the random number stored in the temporary storage unit with the noise-added identification information by radio.

3. An RFID tag device according to claim 1, further comprising a time measuring unit which measures a time after transmitting the noise-added identification information from the radio communication unit,
   wherein the radio communication unit transmits a subsequent noise-added identification information when the time measured by the time measuring unit is a predetermined time or more.

4. An RFID tag device according to claim 1, further comprising a noise generator which generates a noise relating to a noise included in the noise-added identification information,
   wherein the radio communication unit transmits the noise generated by the noise generator with the noise-added identification information by radio.

5. An RFID tag device, comprising:
   a filter holding unit which holds a filter having a plurality of bits capable of probabilistically detecting whether or not a certain bit string is included in a group of bit strings;
   a random number generator which generates a random number or a pseudo-random number;
   a noise addition processing unit which generates a noise-added filter obtained by either of reversal from "0" of a bit decided based on the random number generated by the random number generator or reversal from "1" of a bit decided based on the random number generated by the random number generator among a plurality of bits included in the filter; and
   a radio communication unit which transmits the noise-added filter by radio.

6. An RFID tag device according to claim 5, wherein the filter held by the filter holding unit is generated by using the identification information having a plurality of bits and a Hash function.

7. An RFID tag device according to claim 5, wherein the filter held by the filter holding unit is a fixed bloom filter.

8. An RFID tag device according to claim 5, wherein the noise addition processing unit generates the noise-added filter obtained by reversing "0" of a bit decided based on the random number generated by the random number generator to "1", among the plurality of bits included in the filter held by the filter holding unit.

9. An RFID tag device according to claim 5, further comprising a filter selector which selects any of a plurality of filters held by the filter holding part,
   wherein the noise-added processing unit generates the noise-added filter corresponding to the filter selected by the filter selector.

10. An RFID tag device according to claim 5, further comprising a temporary storage unit which stores the random number generated by the random number generator,
    wherein the radio communication unit transmits the random number stored in the temporary storage unit with the noise-added filter by radio.

11. An RFID tag device according to claim 5, further comprising a time measuring unit which measures a time after transmitting the noise-added filter from the radio communication unit,
    wherein the radio communication unit transmits a subsequent noise-added filter when the time measured by the time measuring unit is a predetermined time or more.

12. An RFID tag device according to claim 5, further comprising a noise generator which generates a noise relating to a noise added to the noise-added filter,
    wherein the radio communication unit transmits the noise generated by the noise generated by the noise generator with the noise-added filter by radio.

13. A tag identification device, comprising:
    a tag information storage unit which stores identification information of a known radio tag device;
    a radio communication unit which receives noise-added identification information or a noise-added filter having a plurality of bits with a noise bit, transmitted from a certain RFID tag device;
    a bit comparison unit which compares a bit having a certain bit value among a plurality of bits included in the received noise-added identification information or the received noise-added filter with corresponding bit of the identification information stored in the tag information storage unit, based on a ratio of bit "0" to bit "1" included in the plurality of bits; and
    a determination unit which determines whether or not the identification information corresponding to the noise-added identification or the noise-added filter received by the radio communication unit is stored in the tag information storage unit based on a result compared by the bit comparison unit.

14. A tag identification device according to claim 13, wherein the filter is generated by using the identification information having a plurality of bits and a Hash function.

15. A tag identification device according to claim 14, wherein the filter is a fixed bloom filter.

16. A tag identification device according to claim 13, wherein the noise-added filter is generated by reversing a bit having "0" to "1" decided by a random number, among the plurality of bits including in the filter before adding the noise.

17. A tag identification device according to claim 13, wherein the radio communication unit receives a random number used for generating the noise which is added to the noise-added identification information or the noise-added filter, and is included in the noise-added identification information or the noise-added filter.

18. A tag identification device according to claim 13, wherein the radio communication unit receives a noise relating to a noise which is added to the noise-added identification information or the noise-added filter, and is included in the noise-added identification information or the noise-added filter.

* * * * *